United States Patent Office 3,202,638
Patented Aug. 24, 1965

3,202,638
FREEZE-THAW MECHANICALLY STABLE LATEX OF A TERPOLYMER OF STYRENE, ALKYL ACRYLATE AND AN ALPHA-BETA VINYLIDENE CARBOXYLIC ACID
Paul R. Van Ess, Berkeley, Calif., assignor to Shell Oil Company, New York, N.Y., a corporation of Delaware
No Drawing. Filed June 1, 1961, Ser. No. 114,047
9 Claims. (Cl. 260—78.5)

The present invention relates to synthetic latex compositions which are interpolymers of three different polymerizable monoethylenic monomers. More particularly, the invention relates to the preparation of a latex composition which is an interpolymer of styrene, an alkyl acrylate and an alpha-unsaturated carboxylic acid.

Copolymers made from monoethylenic monomers containing a vinyl group in aqueous emulsion are known to be useful as surface coatings, paper coatings, and for other uses. Such latices are particularly valuable for surface coatings or paints. Paints made with alkyl acrylates have known advantages such as compatibility with pigments, scrub resistance, good exterior weather resistance, good color stability, and the like, and such films therefore possess certain superiorities over other paint latices such as rubber latex compositions. However, the cost of the acrylate latices has been comparatively higher than with other monoethylenic monomers because more expensive monomers are required.

In general, acrylate latices contain a monomer which by itself would form a soft polymer such as an alkyl acrylate together with a monomer which by itself would yield a hard polymer such as methyl methacrylate or styrene. However, certain difficulties are experienced in preparing latices utilizing styrene and alkyl acrylates which have a satisfactory freeze-thaw and mechanical stability and, at the same time, can be made without excessive coagulation during the polymerization thereof.

In accordance with the present invention, a process has been developed which provides a suitable emuslifier system and a so-called redox catalyst system in which acrylates and styrene may be copolymerized to provide a stable latex in a practical and efficient manner.

In order to provide the desired copolymerization, it is necessary to include as a comonomer an alpha-beta vinylidene carboxylic acid. Examples of suitable alpha-beta vinylidene carboxylic acids include acrylic acid, methacrylic acid, and itaconic acid. The amount of acid used will depend to some extent on the monomer system employed and on the equivalent weight of the acid. Thus, in general, the amount of acid will be from about 0.5 to 5% by weight based on the total monomer and, for methacrylic or acrylic acid, the amount will be more generally from about 1–3% by weight of the total monomer.

The reaction is carried out in an aqueous emulsion which contains a pair of anionic emulsifiers together with a nonionic emulsifier which augments the efficiency of the anionic emulsifiers and confers stability to the system during the polymerization. The anionic emulsifiers are generally present at full concentration during the entire polymerization reaction and includes a water soluble and an oil soluble anionic emulsifier. The water soluble anionic emulsifier may be a salt of an organic sulfate such as an alkali metal salt of an alkyl-aryl-polyethoxy-ethanol sulfate. A representative sodium salt of alkyl aryl-polyethoxy-ethanol sulfate is available commercially under the trade name of "Triton 770." The preferred oil soluble anionic emulsifier is an alkyl ester of sulfosuccinic acid salt. An example of a suitable alkyl ester of sulfosuccinic acid salt includes the dihexyl ester of sodium sulfosuccinic acid which is available commercially under the trade name "Aerosol MA." The amounts of each anionic emulsifier will vary depending on the monomers, catalyst and specific emulsifiers used. However, it will generally be within the range of, say, 0.3 to 3% by weight based on total monomer for each one.

The nonionic emulsifier may be present in part or not at all initially with the remainder added during the process to improve the stability of the polymer particles as they are formed. The nonionic emulsifiers are composed of a hydrophobic or hydrocarbon portion and a hydrophilic portion which is a polyether chain usually terminated with an alcoholic hydroxyl group. Generally, the hydrophilic portion will contain repeating units of, say, 20–50 ether groups and hydrocarbon moieties of, say, about 7 to 12 carbon atoms. Particularly suitable is an octylphenol-ethylene oxide condensation product, and other suitable products include those made by condensing ethylene oxide with alcohols such as nonyl, dodecyl, tetradecyl or alkylphenyls having alkyl groups of 6–15 carbon atoms. The amount of nonionic emulsifier varies with the system, but it will generally be within the range of say from 0.5 to 10% by weight based on total monomer.

As indicated above, the monomer mixture includes an acrylic ester and styrene or a styrene derivative together with the carboxylic acid mentioned above. The proportions of acrylic ester and styrene or equivalent are determined by the particular acrylic ester used. For example, the proportions given in the table below illustrate the optimum proportions where styrene is used with various alkyl acrylates.

| Type acrylate | Percent styrene | Percent acrylate | Percent methacrylic acid |
| --- | --- | --- | --- |
| Methyl acrylate | 4.1 | 94.6 | 1.3 |
| Ethyl acrylate | 23.9 | 73.5 | 2.6 |
| Isopropyl acrylate | 11.9 | 86.8 | 1.3 |
| Sec-butyl acrylate | 32.4 | 65.0 | 2.6 |
| N-butyl acrylate | 39.0 | 58.4 | 2.6 |

The preferred combination is that of ethyl acrylate and styrene together with methacrylic acid as shown in the table above. This utilizes a comparatively good percentage of styrene and yet provides an exceptionally good coating latex as will be more fully illustrated hereinafter.

As indicated above, styrene is a required monomer in this invention although certain equivalents such as styrene which is nuclearly substituted with inert groups such as alkyl groups having from 1 to 4 carbon atoms and halo groups may be used in place of all or part of the styrene.

In general, any alkyl acrylate having from 4 to 12 carbon atoms may be used such as methyl acrylate, ethyl acrylate, propyl acrylate, isopropyl acrylate, any butyl acrylate, and 2-ethylhexyl acrylate. However, the preferred acrylates are those in which the alkyl group has from 2 to 4 carbon atoms such as ethyl, propyl, and butyl.

As indicated above, the polymerization must be carried out in an emulsion in such a way that the monomers or polymers do not coagulate and which provides a stable product emulsion polymer. Thus, the preferred catalyst system is a redox system which allows excellent control of the polymerization and enables the reaction to proceed smoothly at optimum reaction temperatures.

In the so-called redox system, the catalyst will be an oxidizing catalyst such as water soluble or partially water soluble hydroperoxide or persulfate. The catalyst then decomposes under the influence of a reducing agent such as ferrous, iron, or sodium hydrosulfite. The reaction is thus controlled by keeping the temperature below the temperature where the peroxide or persulfate decomposes thermally and the desired decomposition effected by the addition of controlled amounts of reducing agent.

In a preferred form, a process is carried out by mixing the monomers together in the desired proportion, mixing water and both anionic emulsifiers or both anionic emulsifiers together with part or all of the nonionic emulsifier to provide an emulsion consisting of the monomer mixture, emulsifying agent, and the peroxide catalyst. A portion of the mixture is then treated with sufficient reducing agent or activator to begin the reaction and allow the desired reaction temperature to be achieved. The further control is then effected by controlled external cooling and by the addition of further emulsion and a proportionate addition of reducing agent to continue the reaction at the desired temperature. After the polymerization is completed, the emulsion is stripped of unreacted monomer and neutralized, and then made alkaline with ammonium hydroxide with a final pH of about 9. Additional stabilizers and/or protective colloids or other additives may be added to protect the stable emulsion latex.

Residual monomer may be removed by steam stripping or any other known procedure for removing unreacted monomer. The latex is now ready for use in textile treating or for pigmentation to make pigmented paints or the like.

In order to better illustrate the invention, the following examples are given.

*Example I*

The apparatus consisted of a conventional three-liter reaction flask, with one central and four peripheral ground glass openings, fitted with a reflux condenser, stirrer, thermometer, nitrogen gas inlet tube, a two-liter separatory funnel with 100 ml. graduations, and a 250 ml. graduated dropping funnel. A monomer mixture was prepared by mixing the following ingredients in the proportions given:

596.5 g. (73.5%) of ethyl acrylate
193.9 g. (23.9%) of styrene
21.1 g. (2.6%) of methacrylic acid 811.5 g.

This monomer mixture was then incorporated into an emulsion premix by adding the following material to two-liter separatory funnel and subjecting the mixture to three cycles of shaking and standing.

811.5 g. monomers
330 ml. distilled water
12.58 g. of the sodium salt of alkyl aryl polyethoxyethanol sulfate (30% solids)
1.60 g. of sodium dihexylsulfosuccinate
2.53 g. tertiarybutyl hydroperoxide
16.2 g. octylphenol-ethylene oxide (1:30) condensation product, 25% solids The reaction flask was swept with nitrogen and 438 ml. of water and 480 ml. of emulsion premix was added. Thus, at this point, the monomers comprised only ca. 36% of the kettle contents.

The kettle was cooled to 15° C. and 6.6 ml. (7.1 g.) of 9.1% solution of sodium hydrosulfite and 1.8 ml. of 1% $FeSO_4 \cdot 7H_2O$ were added under nitrogen. During an induction period of 90 minutes, the temperature rose from 38° C., at which time external heat was applied. When the temperature had attained ca. 65° C., incremental addition of the emulsion premix was started and continued at a rate to maintain smooth reaction.

The balance of the feed emulsion (ca. 800 ml.) was added over a period of 1 hour 40 minutes, maintaining an average temperature of about 72° C. with slight external heating. Reducing agent was added incrementally and proportionately to the amount of tertiarybutyl hydroperoxide being added via feed emulsion to maintain a steady supply of free radicals. The balance of the reducing agent was added in combination with nonionic surfactant in a solution consisting of 10.8 ml. (11.6 g.) of 9.1% sodium hydrosulfite solution in 48.7 g. (1.5 p.h.m.) of a solution of octylphenol-ethylene oxide (1:30) condensation product (25% solids). This solution was introduced dropwise in such a manner that when all the emulsion premix had been added, there remained 15 ml. of $Na_2S_2O_4$-OPE–30 solution in the separatory funnel. To ensure completion of reaction, 0.27 g. tertiarybutyl hydroperoxide was added with concomitant addition of the balance of the $Na_2S_2O_4$ octylphenol-ethylene oxide solution. Digestion was continued one-half hour at 74° C.

As additional stabilizer, 16.2 g. of a 2.5% solution of sodium polyacrylate, 12.5% solids, was added. The total reaction mixture (1675 g.) was filtered through two layers of cheesecloth. The precoagulum, after washing and drying, amounted to 28.5 g. or 3.5 p.h.m. (parts per hundred parts monomer). The total solids content was determined to be 47.4% compared to a calculated value of 49.2% representing 96.4% conversion from monomer to polymer. The average particle size in the latex was determined by a light transmission method to be about 1700 A.

The filtered latex, stripped of unreacted monomer by heating at 32° C. for 15–25 minutes, was neutralized with 29% ammonium hydroxide, changing the pH from 3.2 to 9.1. Satisfactory freeze-thaw stability is achieved by further addition to the latex of either (1) sufficient octylphenol-ethylene oxide (1:30) condensation product to bring the total amount to 3.0 parts per 100 parts monomer along with 3.0 parts per 100 parts monomer of octylphenol-ethylene oxide (1:10) condensation product, or (2) sufficient octylphenol-ethylene oxide (1:30) condensation product to bring the total amount to 4.0 parts per 100 parts monomer and sufficient ammonium hydroxide to increase the pH to 9.9.

The latex was subjected to tests to evaluate its use for paints. The resins form a continuous film having a hardness similar to that of present commercial acrylate paints. It has good bulk properties, that is, it is stable to viscosity change on storage and is stable to a plurality of freeze-thaw cycles.

The latex was converted into paints and thoroughly tested. It had a good color development, that is, good pigment acceptance and good resistance to water. The paints showed improved scrubability or good wet abrasion resistance. Weather tests under diversified conditions show good exterior durability, particularly on asbestos shingles, masonry and boards which have a coat of primer paint.

*Example II*

The procedure of Example I is repeated except that the monomer mixture contains 86.8% isopropyl acrylate, 11.9% styrene and 1.3% methyl methacrylate. A paint latex is obtained which is stable when subjected to freezing and thawing, agitation and the addition of electrolytes.

*Example III*

The procedure of Example I is repeated except that two butyl acrylates are used for the acrylate monomer in two different runs. In one case, the monomer mixture consists of 58.4% n-butyl acrylate, 39.0% styrene and 2.6% methyl methacrylate. In the other case, the monomer mixture consists of 65.0% sec-butyl acrylate, 32.4% styrene and 2.6% methyl methacrylate. In both cases, stable paint latices are obtained.

*Example IV*

The apparatus consisted of a conventional three-liter reaction flask, with one central and four peripheral ground glass openings, fitted with a reflux condenser, stirrer, thermometer, nitrogen gas inlet tube, a two-liter separatory funnel with 100 ml. graduations, and a 250 ml. graduated dropping funnel.

A monomer mixture was prepared by mixing the following ingredients in the proportions given:

767.7 g. (94.6%) of methyl acrylate
33.3 g. (4.1%) of styrene
10.5 g. (1.3%) of methacrylic acid 811.5 g.

This monomer mixture was then used to prepare an emulsion premix which was made by adding the following material to two-liter separatory funnel:

811.5 g. monomers
330 ml. distilled water
12.58 g. of the sodium salt of alkyl aryl polyethoxyethanol sulfate (30% solid)
1.60 g. of sodium dihexylsulfosuccinate (80% solids)
3.6 ml. of a 25% solution of ammonium persulfate.

The reaction flask or kettle was swept with nitrogen and 480 ml. (ca. 38%) of emulsion premix were added. Thus at this point, the monomers comprised only ca. 36% of the kettle contents.

The kettle was cooled to 15° C. and 5.4 ml. (5.8 g.) of 9.1% solution of sodium hydrosulfite and 1.8 ml. of 1% $FeSO_4.7H_2O$ were added under nitrogen. During an induction period of 22 minutes, the temperature rose from 15° C. to only 23° C., but then the reaction accelerated markedly, so that the temperature rose to 85° C. in the next three minutes. When the temperature had been lowered to 70–75° C. by external cooling, incremental addition of the emulsion premix was started and continued at a rate to maintain smooth reaction.

The balance of the feed emulsion (ca. 780 ml.) was added over a period of 1.5 hours, maintaining an average temperature of ca. 72° C. without external heating or cooling. Reducing agent was added incrementally and proportionately to the amount of persulfate being added via the feed emulsion to maintain a steady supply of free radicals. Thus, a solution of 4.5 ml. (4.8 g.) of 9.1% sodium hydrosulfite in 60 ml. water was added dropwise to the kettle concomitantly with the addition of the first half (390 ml. of emulsion premix. The balance of the reducing agent was added in combination with nonionic surfactant: 4.5 ml. (4.8 g.) of 9.1% sodium hydrosulfite dissolved in 130 g. of octylphenol-ethylene oxide (1:30) condensation product solution (25% solids) was introduced dropwise in such a manner that when all emulsion premix had been added, there was about 70 ml. of $Na_2S_2O_4$ octylphenol-ethylene oxide solution still in the dropping funnel. More initiator was added to ensure completion of reaction: tertiary butyl hydroperoxide was added in two dumps of 0.45 g. and 0.23 g. with concomitant addition of the balance of $Na_2S_2O_4$ octylphenol-ethylene oxide solution. Digestion was continued for 1 hour at 70° C. The latex was stripped of unreacted monomer by heating at 30–35° C. for 15–25 minutes, taking 10–30% overload.

The reaction mixture, cooled to 25° C., was neutralized under good agitation with 7.7 g. of 29% concentrated ammonium hydroxide, changing the pH from 3.5 to 9.1.

As additional stabilizer, 16.2 g. (0.05 p.h.m.) of a 2.5% solution of sodium polyacrylate (12.5% solids) was added. The total reaction mixture (1774 g.) was filtered through two layers of cheesecloth, then through cotton flannel. The precoagulum, after washing and drying, amounted to 3.42 g. or 0.42 p.h.m. The total solids content was determined to be 47.0%, compared to a calculated value of 47.9%, representing a 98% conversion from monomer to polymer. The average particle size in the latex was determined by a light transmission method to be about 1300 A.

The latex was subjected to five cycles of alternate freezing (−23° C.) and thawing (25° C.) without coagulation. Also there was no coagulation or significant change in viscosity when subjected to mechanical agitation by stirring for 30 minutes in a Hamilton-Beach malted milk mixer. The latex was also stable when equal volumes of 5% sodium chloride, 5% calcium chloride, 5% alum, or isopropyl alcohol, were added to it.

*Example V*

In this example a paper-textile latex is prepared. The apparatus was essentially the same as that described above in the preparation of acrylic paint latex.

The monomer mixture employed was as follows:

726.3 g. (89.5%) of ethyl acrylate.
64.9 g. (8.0%) of styrene
20.3 g. (2.5%) of itaconic acid 811.5 g.

The monomer emulsion premix was made by adding the following material to the two-liter separatory funnel:

811.5 g. monomers
330 ml. distilled water
16.77 g. of the sodium salt of alkyl aryl polyethoxy sulfate
213 g. of sodium dihexylsulfosuccinate (80% solids)
3.60 ml. of 25% solution of ammonium persulfate
16.3 g. of octylphenol-ethylene oxide condensation product The emulsion was prepared by three cycles of shaking and standing of the separatory funnel. The total volume of the emulsion was about 1300 ml. To the nitrogen swept kettle was added 480 ml. of water and 480 ml. (35%) of the emulsion premix.

The kettle was cooled to 15° C. and 5.4 ml. (5.8 g.) of a 9.1% solution of sodium hydrosulfite and 1.8 ml. of 1% $FeSO_4.7H_2O$ were added under nitrogen. The reaction started immediately and in 26 minutes the temperature rose to 70° C. without external heating. At this point, incremental addition of the emulsion premix was started. The balance of the feed emulsion (820 ml) was added over a period of 1.5 hours, maintaining an average temperature of about 71° C. Some external heating was required. Reducing agent, in combination with nonionic surfactant, was added icrementally and proportionately to the amount of persulfate being introduced via feed emulsion to maintain a steady supply of free radicals. Thus, a solution of 9.0 ml. (9.6 g.) of 9.1% sodium sulfite in 113.8 (3.5 p.h.m.) of octylphenol-ethyleneoxide condensation product solution (25% solids) was introduced in such a manner that when all emulsion premix had been added, there was about 32 ml. of $Na_2S_2O_4$ octylphenol-ethylene oxide condensation product solution left in the dropping funnel. More initiator was added at this point to ensure completion of reaction: tertiary butyl hydroperoxide was added in two dumps of 0.45 g. and 0.23 g. with concomitant addition of the balance of $Na_2S_2O_4$ octylphenol-ethyleneoxide condensation product solution. After addition of TBHP and reducing agent, the kettle contents were digested for 10 minutes at 70° C.

The reaction mixture, cooled to 25° C., was neutralized under good agitation with 14.5 g. of 30% NaOH, changing the pH from 3.1 to 6.1.

The total reaction mixture (1791 g.) was filtered through cheesecloth and cotton flannel. The precoagulum, after washing and drying, amounted to 2.30 g. or 0.28 p.h.m. The total solids content found was 46.7% compared to a calculated value of 47.6%, representing a 98% conversion from monomer to polymer.

Applying a light transmission method for determining particle size, the value obtained for the latex was 1240 A.

The experimental paper-textile latex coagulated in one cycle of freeze-thaw did not coagulate under vigorous agitation in Hamilton-Beach mixer and was stable in the presence of electrolyte solutions, 5% NaCl, 5% $CaCl_2$, 5% alum, and isopropanol. Thus, the latex is suitable for application to paper or textiles.

I claim as my invention:

1. The method of making freeze-thaw mechanically stable latex by copolymerizing at least three monoethylenically unsaturated polymerizable monomers in an emulsion system comprising mixing (1) a single monomer mixture consisting essentially of from about 4 to about 40% of the member selected from the class consisting of styrene, alkyl-substituted styrene wherein said alkyl groups contain from 1 to 4 carbon atoms and halo-substituted styrene, said substituted styrenes being ring substituted, from about 55 to 95% of an alkyl acrylate having from 4 to 7 carbon atoms, and from about 0.5–5% by weight of an alpha-beta vinylidene carboxylic acid, (2) an aqueous emulsion consisting essentially of (a) an alkali metal salt of an alkyl aryl polyethyoxyethanol sulfate, (b) a sulfosuccinic acid salt and (c) a condensation product of ethylene oxide and alcohols containing alkyl groups having from 6-15 carbon atoms, and (3) an oxidizing agent, and adding reducing agent in an amount sufficient to cause polymerization while simultaneously keeping the temperature of the reaction mixture between about 15 and 85° C., said (a) and (b) being each employed in the range of from 0.3 to 3% by weight based on total monomer and said (c) being employed in the range from 0.5 to 10% by weight based on total monomer.

2. The method defined in claim 1 in which the temperature of the reaction mixture is maintained between about 70 and 75° C. during at least 75% of the reaction period.

3. The method defined in claim 1 in which a minor portion of the reaction mixture is first brought together and the reaction temperature is adjusted between about 70 and 75° C., and thereafter the major portion of the reaction mixture is added in multiple additions while maintaining the reaction temperature between 70 and 75° C.

4. A method of making a freeze-thaw mechanically stable latex by copolymerizing at least three monoethylenically unsaturated polymerizable monomers in an emulsifier system comprising mixing (1) a single monomer mixture consisting essentially of from about 4 to about 40% of styrene, from about 55 to 95% of an alkyl acrylate having from 4 to 7 carbon atoms, and from about 0.5 to 5% by weight of an alpha-beta vinylidene carboxylic acid having 3 to 4 carbon atoms (2) an aqueous emulsion consisting essentially of (a) an alkali metal salt of an alkyl aryl polyethoxyethanol sulfate, (b) a sulfosuccinic acid salt and (c) a condensation product of ethylene oxide and alcohols containing alkyl groups having from 6-15 carbon atoms, and (3) an oxidizing agent, and adding reducing agent to the reaction mixture in an amount sufficient to cause polymerization while simultaneously adjusting and maintaining the temperature of the reaction mixture between about 15 and 85° C., said (a) and (b) being each employed in the range of from 0.3 to 3% by weight based on total monomer and said (c) being employed in the range from 0.5 to 10% by weight based on total monomer.

5. The method defined in claim 4, in which the emulsifier consists of a sodium salt of alkyl aryl polyethoxyethanol sulfate, an alkyl ester of a sulfosuccinic acid salt, and octylphenol-ethylene oxide condensation product.

6. A method of making a freeze-thaw mechanically stable latex comprising mixing a single monomer mixture consisting essentially of about 23.9% styrene, about 73.5% ethyl acrylate, and about 2.6% methacrylic acid with an aqueous emulsion consisting essentially of (a) an alkali metal salt of an alkyl aryl polyethoxyethanol sulfate, (b) a sulfosuccinic acid salt and (c) a condensation product of ethylene oxide and alcohols containing alkyl groups having from 6–15 carbon atoms, and an oxidizing agent, and adding reducing agent to the mixture in an amount sufficient to cause polymerization while simultaneously adjusting and maintaining the temperature of the reaction mixture between about 15 and 85° C., said (a) and (b) being each employed in the range of from 0.3 to 3% by weight based on total monomer and said (c) being employed in the range from 0.5 to 10% by weight based on total monomer.

7. The method defined in claim 6, in which the temperature of the reaction mixture is maintained between about 70 and 75° C. during at least 75% of the reaction period.

8. The method defined in claim 6, in which a minor portion of the reaction mixture is first brought together and the reaction temperature is adjusted between about 70 and 75° C., and thereafter the major portion of the reaction mixture is added in multiple additions while maintaining the reaction temperature between 70 and 75° C.

9. The method defined in claim 6, in which the emulsifier consists of a sodium salt of alkyl aryl polyethoxyethanol sulfate, a dihexyl ester of sodium sulfosuccinic acid, and octylphenol-ethylene oxide condensation product.

References Cited by the Examiner

UNITED STATES PATENTS

| | | | |
|---|---|---|---|
| 2,962,465 | 11/60 | Lindstrom et al. | 260—80.5 |
| 2,966,470 | 12/60 | Maltenfort | 260—29.6 |
| 3,014,881 | 12/61 | La Barre | 260—80.5 |

JOSEPH L. SCHOFER, Primary Examiner.

LEON J. BERCOVITZ, Examiner.